(12) United States Patent
Watabe et al.

(10) Patent No.: US 7,957,880 B2
(45) Date of Patent: Jun. 7, 2011

(54) SLIP DETECTION AND TRACTION CONTROL FOR A VEHICLE

(75) Inventors: Satoru Watabe, Akashi (JP); Hiroyuki Ohno, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 763 days.

(21) Appl. No.: 12/074,726

(22) Filed: Mar. 5, 2008

(65) Prior Publication Data

US 2009/0228183 A1 Sep. 10, 2009

(51) Int. Cl.
- *B60K 28/16* (2006.01)
- *B60W 10/06* (2006.01)
- *B60W 10/02* (2006.01)
- *B60W 30/02* (2006.01)

(52) U.S. Cl. .......... 701/90; 180/197; 180/338; 477/176

(58) Field of Classification Search ............... 477/176; 180/197, 388; 701/90
See application file for complete search history.

(56) References Cited

U.S. PATENT DOCUMENTS

| | | | | |
|---|---|---|---|---|
| 2,959,070 A | * | 11/1960 | Flinn | 74/664 |
| 3,572,168 A | * | 3/1971 | Shirai et al | 475/62 |
| 3,667,813 A | * | 6/1972 | Burckhardt et al. | 303/141 |
| 3,710,630 A | * | 1/1973 | Sumiyoshi et al. | 475/63 |
| 4,214,489 A | * | 7/1980 | Ahlen et al. | 475/277 |
| 4,544,909 A | * | 10/1985 | Di Nunzio | 340/439 |
| 4,771,848 A | * | 9/1988 | Namba et al. | 180/197 |
| 4,827,802 A | * | 5/1989 | Marier | 477/123 |
| 4,961,484 A | * | 10/1990 | Kato et al. | 192/3.31 |
| 5,143,191 A | * | 9/1992 | Nobumoto et al. | 192/76 |
| 5,351,779 A | * | 10/1994 | Yamashita | 180/197 |
| 5,403,249 A | * | 4/1995 | Slicker | 477/176 |
| 5,731,976 A | * | 3/1998 | Tsuyama et al. | 701/84 |
| 6,067,801 A | * | 5/2000 | Harada et al. | 60/705 |
| 6,208,034 B1 | * | 3/2001 | Yamaguchi | 290/40 C |
| 6,330,927 B1 | * | 12/2001 | Tokuda | 180/197 |
| 6,334,079 B1 | * | 12/2001 | Matsubara et al. | 701/22 |
| 6,334,835 B1 | * | 1/2002 | Tanaka et al. | 477/205 |
| 6,380,641 B2 | * | 4/2002 | Matsubara et al. | 290/40 C |
| 2001/0004203 A1 | * | 6/2001 | Matsubara et al. | 322/16 |
| 2001/0039231 A1 | * | 11/2001 | Van Lith et al. | 477/44 |
| 2004/0166987 A1 | * | 8/2004 | Buchanan et al. | 477/70 |
| 2005/0288153 A1 | * | 12/2005 | Whitton | 477/146 |
| 2006/0089776 A1 | * | 4/2006 | Segawa et al. | 701/67 |

FOREIGN PATENT DOCUMENTS

JP 04-203333 7/1992

(Continued)

*Primary Examiner* — Mark Hellner
*Assistant Examiner* — Ari M Diacou
(74) *Attorney, Agent, or Firm* — Alleman Hall McCoy Russell & Tuttle LLP

(57) ABSTRACT

A slip detection system for a vehicle comprises an engine speed detector configured to detect an engine speed of an engine mounted in the vehicle, an engine speed increase rate detector configured to detect an increase rate in a predetermined time of the engine speed detected by the engine speed detector, and a slip determiner configured to integrate values of increase rates in respective predetermined times, from when the increase rate detected by the engine speed increase rate detector becomes larger than a first threshold until the increase rate becomes smaller than the first threshold, and to determine that a drive wheel of the vehicle is in a slip-state when an integrated value resulting from integration of the values of the increase rates becomes larger than a second threshold.

18 Claims, 10 Drawing Sheets

| | FOREIGN PATENT DOCUMENTS | | JP | 2002-067741 A | 3/2002 |
|----|----|----|----|----|----|
| JP | 07-103009 | 4/1995 | JP | 2004-096822 A | 3/2004 |
| JP | 07-279712 | 10/1995 | | | |
| JP | 10-331676 | 12/1998 | * cited by examiner | | |

| COMPENSATION MAP | OPENING DEGREE CHANGE AMOUNT OF THROTTLE VALVE | | | | | | |
|---|---|---|---|---|---|---|---|
| OPENING DEGREE OF THROTTLE VALVE | 0 | 5 | 10 | 20 | 40 | 60 | 100 |
| 0.0 | 0.0 | 0.0 | 0.0 | 0.0 | 0.0 | 0.0 | 0.0 |
| 20.0 | 1.0 | 1.0 | 0.8 | 0.4 | 0.3 | 0.1 | 0.0 |
| 40.0 | 1.0 | 1.0 | 0.8 | 0.4 | 0.3 | 0.1 | 0.0 |
| 60.0 | 0.5 | 0.5 | 0.4 | 0.2 | 0.2 | 0.1 | 0.0 |
| 80.0 | 0.3 | 0.3 | 0.2 | 0.1 | 0.1 | 0.0 | 0.0 |
| 100.0 | 0.0 | 0.0 | 0.0 | 0.0 | 0.0 | 0.0 | 0.0 |

Fig. 8

SLIP DETECTION AND TRACTION CONTROL FOR A VEHICLE

BACKGROUND ART

There has been proposed a traction control system configured to reduce a vehicle engine driving power in order to restore drive wheel traction for the vehicle with respect to a road surface when a slip occurs in the drive wheel (see e.g., Japanese Laid-Open Patent Application Publication No. Hei. 7-103009). According to this control system, when an increase rate of an engine speed becomes larger than a predetermined threshold, an ignition retard control is used so that an ignition timing of the engine is retarded with respect to an optimal ignition timing to thereby reduce engine driving power. Thus, further slip is inhibited.

This traction control system is able to detect a rapid increase in the engine speed which is caused by abrupt spinning of the drive wheel, for example, when the vehicle is traveling over a crack in a road surface, but has difficulty in distinguishing between the slip and an engine noise in a normal state, where the increase rate in the engine speed does not rapidly rise during continued and gradual sliding of the drive wheel, for example, when the vehicle is traveling around a corner at a low speed. Therefore, it is advantageous to set a threshold to turn on and off traction control based on a change in the increase rate of the engine speed. Whereas the threshold may be easily set when the change in the increase rate is large, it is difficult to set a threshold for distinguishing between the slip and the engine noise when the change in the increase rate is small, which may result in a false slip detection. This decreases precision in the traction control.

SUMMARY OF THE INVENTION

According to one aspect of the present invention, there is provided a slip detection system for a vehicle, comprising an engine speed detector configured to detect an engine speed of an engine mounted in the vehicle, an engine speed increase rate detector configured to detect an increase rate in a predetermined time of the engine speed detected by the engine speed detector, and a slip determiner configured to integrate values of increase rates in respective predetermined times, from when the increase rate detected by the engine speed increase rate detector becomes larger than a first threshold until the increase rate becomes smaller than the first threshold, and to determine that a drive wheel of the vehicle is in a slip-state when an integrated value resulting from integration of the values of the increase rates becomes larger than a second threshold.

In such a configuration, in cases where the increase rate of the engine speed becomes larger than the first threshold for a moment due to, for example, an engine noise, it is determined that the drive wheel is in a substantially non-slip state, whereas it is determined that the drive wheel is in the slip state only when the integrated value resulting from integration of the values of the increase rates becomes larger than the second threshold because the value of the increase rate of the engine speed continuously becomes larger than the first threshold. In order to accurately detect an occurrence of a slip in which the increase rate of the engine speed is small, it is advantageous to set the first threshold lower. The integrated increase rate value does not become larger than the second threshold unless the value of the increase rate of the engine speed continuously becomes larger than the first threshold. This makes it possible to reduce the chances for a mistaken detection that the drive wheel is in the slip state when the increase rate of the engine speed discontinuously becomes larger than the first threshold due to the engine noise, etc. As a result, it becomes possible to detect with higher precision whether or not the drive wheel is in the slip state on a road surface.

The first threshold may have a hysteresis in which a value at which integration of the values of the increase rates terminates is smaller than a value at which integration of the values of the increase rates starts.

In such a configuration, the increase rate of the engine speed is less likely to become smaller than the first threshold at which integration of the values of the increase rates terminates even though the increase rate of the engine speed decreases due to the engine noise, etc., after the value of the increase rate of the engine speed has become larger than the first threshold at which integration starts. This makes it possible to reduce the chances of the integration terminating by mistake even though the increase rate of the engine speed may fluctuate because of some detection error. Thus, it becomes possible to correctly start and terminate the integration of the values of the increase rates of the engine speed using the first threshold as a reference.

The first threshold may have a start threshold at which integration of the values of the increase rates starts and a termination threshold at which integration of the values of the increase rates terminates. The termination threshold may be smaller than the start threshold.

The second threshold may be set to a value which is not smaller than three times as large as a numeric value corresponding to the start threshold and is not larger than ten times as large as the numeric value corresponding to the start threshold.

The slip detection system for a vehicle may further comprise a vehicle speed sensor configured to detect a vehicle speed value of the vehicle, a gear position sensor configured to detect a gear position of a transmission in the vehicle, and a gear ratio memory configured to pre-store data indicating a relationship between an engine speed and a vehicle speed for each gear position in a state where a clutch of the vehicle is in an on-state. A slip determiner may determine that the drive wheel is in a non-slip state when the vehicle speed value detected by the vehicle speed sensor is at least a predetermined allowable error from a vehicle speed value which is stored in the gear ratio memory and corresponds to the gear position detected by the gear position sensor and the engine speed detected by the engine speed detector.

In such a configuration, the actual gear position, the actual engine speed, and the actual vehicle speed value are compared to data in the on-state of the clutch which is stored in the gear ratio memory, and it can be determined that the clutch is in the on-state when there is a match between them, whereas it can be determined that the clutch is in an off-state when there is a mismatch between them In other words, it can be determined whether a rapid increase in the engine speed is due to occurrence of the slip or operation of the clutch. Thus, false detection of the slip can be reduced even though the increase rate of the engine speed rises because of an off-operation of the clutch. As a result, slip detecting precision can be improved.

The vehicle speed sensor may be configured to detect the vehicle speed of the vehicle based on the number of rotations of an output shaft of the transmission.

The slip determiner may determine that the vehicle speed value is within a range of the predetermined allowable error when a ratio R(n) of engine speed to vehicle speed as a function of gear position n is represented by a formula (1):

$$R(n) = \text{engine speed/vehicle speed} \quad (1),$$

and a formula (2) represented by:

$$\{R(n)+R(n+1)\}/2 < R(n) < \{R(n)+R(n-1)\}/2 \quad (2),$$

where n is a positive integer, and $1.1 \times R(1) < R(0) < 2.0 \times R(1)$.

According to another aspect of the present invention, there is provided a traction control system for a vehicle, which is configured to inhibit a slip in a drive wheel of the vehicle, using a slip detection system for the vehicle, including an engine speed detector configured to detect an engine speed of an engine mounted in the vehicle, an engine speed increase rate detector configured to detect an increase rate in a predetermined time of the engine speed detected by the engine speed detector, and a slip determiner configured to integrate values of increase rates in respective predetermined times, from when the increase rate detected by the engine speed increase rate detector becomes larger than a first threshold until the increase rate becomes smaller than the first threshold, and to determine that a drive wheel of the vehicle is in a slip-state when an integrated value resulting from integration of the values of the increase rates becomes larger than a second threshold, the traction control system comprising a traction controller configured to reduce a driving power of the engine when the slip detection system determines that the drive wheel is in the slip state.

In such a configuration, the driving power of the engine can be reduced to a value smaller than that just before the determination, thereby automatically restoring drive wheel traction with respect to the road surface, when the slip determiner determines that the drive wheel is in the slip state.

The traction controller may be configured to execute an ignition retard control to retard an ignition timing for an engine, thereby reducing the driving power of the engine, when a slip determiner determines that the drive wheel is in the slip state.

In such a configuration, the ignition retard control is used so that the driving power of the engine can be reduced quickly and easily when the drive wheel is in the slip state.

The traction controller may be configured to execute the ignition retard control so as to increase an ignition retard angle amount as the integrated value increases.

In such a configuration, as the integrated value of the increase rates of the engine speed increases and an amount of the slip increases, the retard angle amount increases, reducing the driving power of the engine in a larger amount. Therefore, in an initial stage of occurrence of the slip, the driving power of the engine is not rapidly reduced. As a result, the drive wheel traction on a road surface can be restored suitably without degrading driving feeling for a driver.

The traction controller may be configured to execute fuel feed amount cut control to reduce an amount of a fuel to be fed to the engine, thereby reducing the driving power of the engine, when the slip determiner determines that the drive wheel is in the slip state.

The traction controller may be configured to execute air-intake amount cut control to reduce an amount of air supplied to the engine, thereby reducing the driving power of the engine, when the slip determiner determines that the drive wheel is in the slip state.

The traction controller may be configured to execute ignition cut control to reduce the number of times of ignition for the engine, thereby reducing the driving power of the engine, when the slip determiner determines that the drive wheel is in the slip state.

The traction control system may further comprise a throttle opening degree sensor configured to detect an opening degree of a throttle valve. The traction controller may be configured to decide a reduction amount of the driving power of the engine according to a change rate of the opening degree of the throttle valve which is detected by the throttle opening degree sensor.

In such a configuration, it becomes possible to identify a situation where the driver has intentionally quickly opened the throttle valve to cause the drive wheel to slip on the road surface, and to decide the retard angle amount correctly. For example, in the case of a vehicle intended for racing, when the throttle valve is quickly opened by the driver, the retard angle amount may be compensated to be reduced to meet the driver's demand.

The reduction amount of the driving power of the engine may be an ignition retard angle amount, a fuel cut amount, an air-intake cut amount, and/or an ignition cut amount.

The traction controller may have a map for a driving power reduction amount in which a reduction amount of the driving power of the engine is set to correspond to the integrated value and the engine speed for each gear position, and a compensation map in which a compensation amount is set to correspond to the opening degree of the throttle valve and an opening degree change amount of the throttle valve. The traction controller may be configured to execute compensation such that a value obtained from the map for a driving power reduction amount is compensated by the compensation amount obtained from the compensation map.

According to a further aspect of the present invention, there is provided a method of detecting a drive wheel slip for a vehicle, comprising detecting an engine speed of an engine mounted in the vehicle, detecting an increase rate in a predetermined time of the engine speed, integrating values of increase rates of the engine speed in respective predetermined times from when the increase rate becomes larger a first threshold until the increase rate becomes smaller than the first threshold, and determining that a drive wheel of the vehicle is in a slip state when an integrated value resulting from integration of the values of the increase rates becomes larger than a second threshold.

It may be determined that the drive wheel is in a non-slip state when an actual vehicle speed value corresponding to an actual gear position and an actual engine speed is at least a predetermined allowable value from data indicating a relationship among an engine speed, a vehicle speed, and a gear position in a state where a clutch of the vehicle is in an on-state.

BRIEF DESCRIPTION OF THE DRAWINGS

FIG. 8 is a view showing a compensation map for compensating a retard angle amount based on an opening degree of a throttle valve and an opening degree change amount of the throttle valve.

DETAILED DESCRIPTION OF THE PREFERRED EMBODIMENTS

Hereinafter, embodiments of the present invention will be described with reference to the drawings.

Embodiment 1

Figure 1:
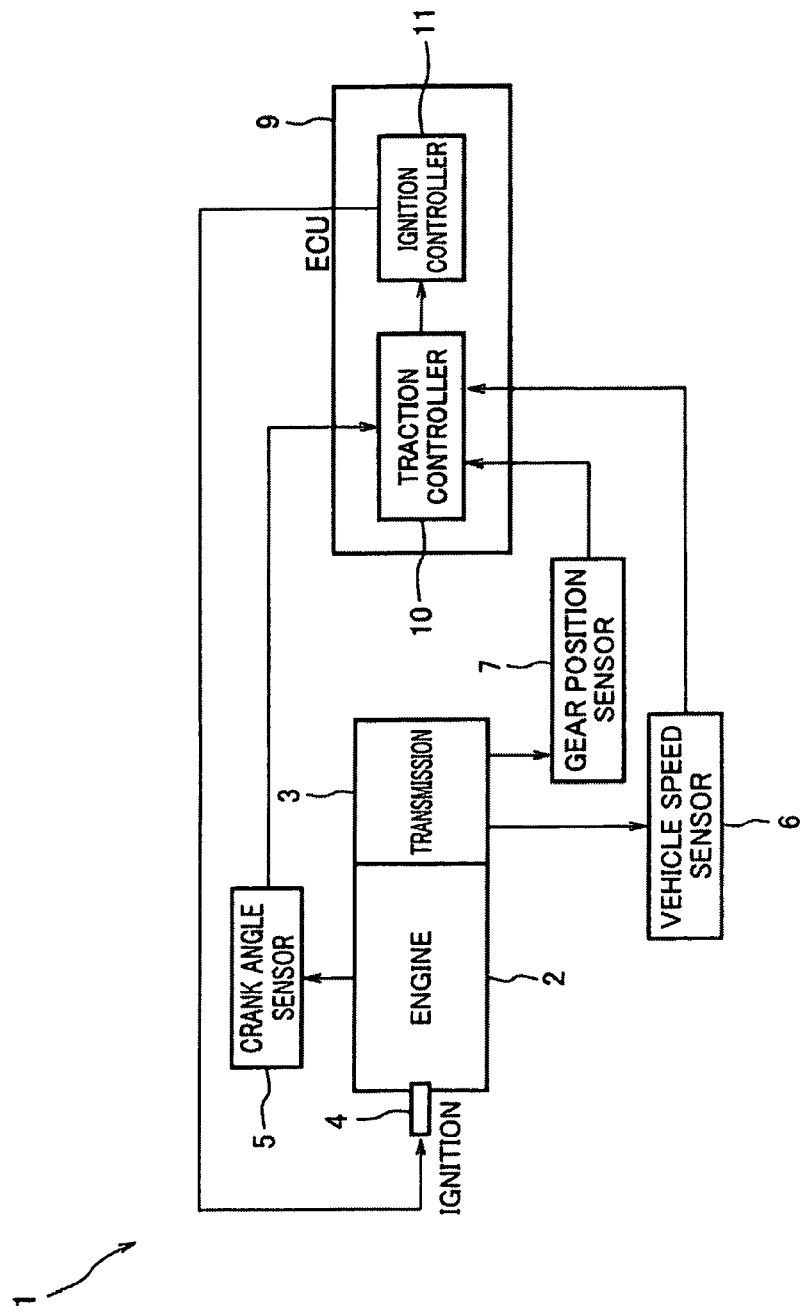
FIG. 1 is a block diagram showing a traction control system in a motorcycle according to a first embodiment.

FIG. 1 is a block diagram showing a traction control system 1 that may be used in a motorcycle (not shown) according to a first embodiment of the present invention. Turning now to FIG. 1, the traction control system 1 includes an engine 2, a transmission 3 which is configured to change a speed of a driving power output from the engine 2 and to transmit it to a drive wheel (not shown), and an ignition device 4 configured to ignite an air-fuel mixture inside a cylinder of the engine 2. A crank angle sensor 5 is attached on a crankshaft of the engine 2 and is configured to be able to detect an engine speed of the engine 2. A vehicle speed sensor 6 is attached on an output shaft of the transmission 3 and is configured to be able to detect a vehicle speed of the motorcycle based on rotation of the output shaft. A gear position sensor 7 is attached on the transmission 3 and is configured to detect a gear position of the transmission 3. Additionally, the motorcycle may include an ECU (electronic control unit) 9.

Figure 2:
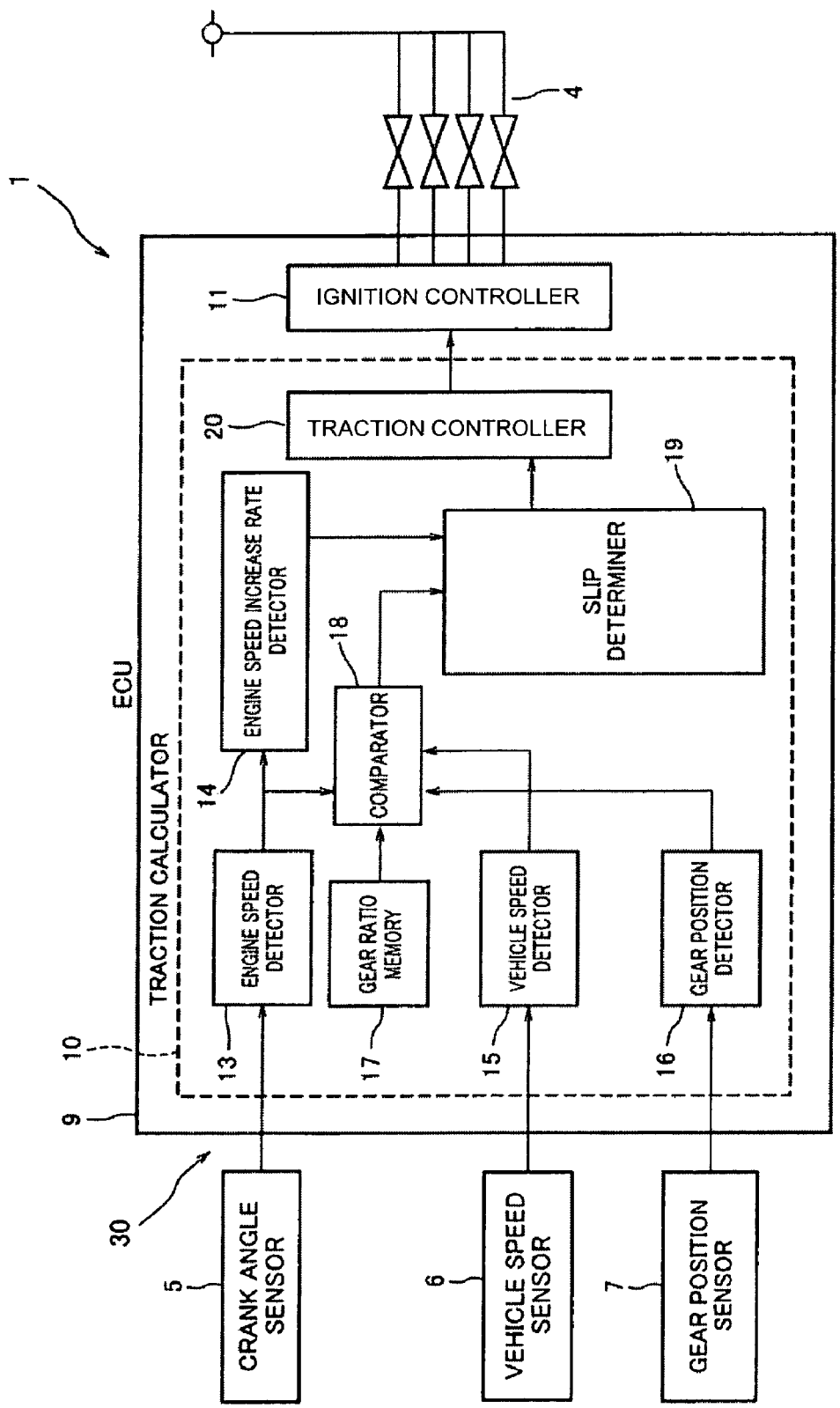
FIG. 2 is a block diagram showing an ECU of the traction control system of FIG. 1.

FIG. 2 is a block diagram showing the ECU 9 of the traction control system 1 of FIG. 1. As shown in FIG. 2, the ECU 9 includes a traction calculator 10 and an ignition controller 11. The traction calculator 10 may include an engine speed detector 13, an engine speed increase rate detector 14, a vehicle speed detector 15, a gear position detector 16, a gear ratio memory 17, a comparator 18, a slip determiner 19, and a traction controller 20.

The engine speed detector 13 may be configured to detect the engine speed of the engine 2 based on a signal from the crank angle sensor 5. The engine speed increase rate detector 14 is configured to detect an increase rate (hereinafter referred to as an increase rate $\alpha$ of the engine speed) in a predetermined time of the engine speed detected by the engine speed detector 13. The increase rate $\alpha$ in the predetermined time is given by $\Delta N/\Delta t$, where N is the engine speed in revolutions per minute, and t is the time in seconds. The vehicle speed detector 15 is configured to detect a vehicle speed of the motorcycle based on a signal from the vehicle speed sensor 6. The gear position detector 16 is configured to detect a gear position based on a signal from the gear position sensor 7.

Figure 5:
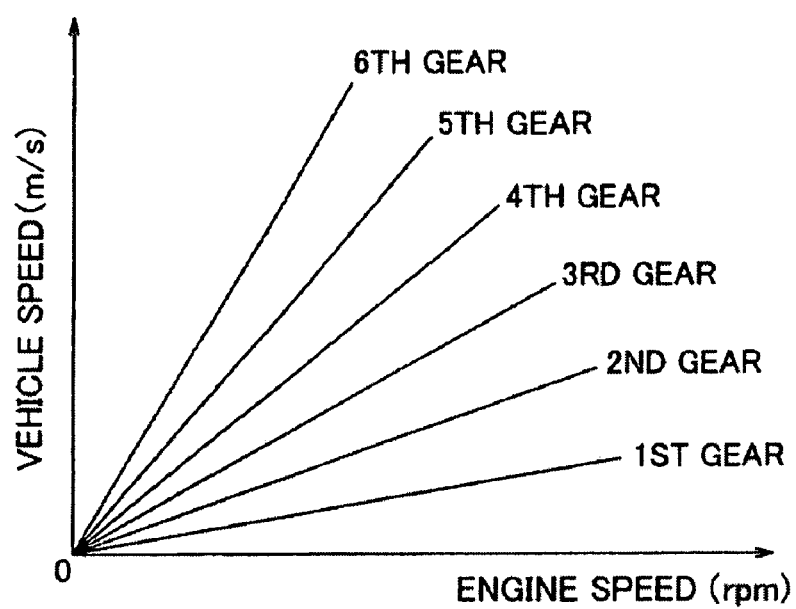
FIG. 5 is a graph showing a relationship between an engine speed and a vehicle speed for each gear position when a clutch is in an on-state.

The gear ratio memory 17 is configured to pre-store data indicating the relationship between the engine speed of the engine 2 and the vehicle speed in the state where a clutch in the motorcycle is in an on-state, to be precise, the relationship between the engine speed and the vehicle speed for each gear position in the state where the clutch is in the on-state, as shown by the graph of FIG. 5. The comparator 18 is configured to compare data obtained from the engine speed detector 13, the vehicle speed detector 15, and the gear position detector 16 to the data stored in the gear ratio memory 17, and to detect whether or not a vehicle speed value detected by the vehicle speed sensor 6 is at least a predetermined allowable error from a vehicle speed value stored in the gear ratio memory 17.

The slip determiner 19 integrates values of the increase rates $\alpha$ of the engine speed sampled in each predetermined time, from when the increase rate $\alpha$ of the engine speed detected by the engine speed increase rate detector 14 becomes larger than a first threshold T1 until it becomes smaller than the first threshold T1, and determines that the drive wheel is in the slip state when an integrated value $\beta$ resulting from integration of the values of the increase rates $\alpha$ becomes larger than a second threshold T2. The first threshold T1 may have a hysteresis in which a value (T1-2) at which integration of the values of the increase rates $\alpha$ terminates is set slightly smaller than a value (T1-1) at which integration of the values of the increase rates $\alpha$ starts. The first threshold T1 (T1-1, T1-2) is set in a range of (1.1×$\Delta$NE to 4.0×$\Delta$NE) when a maximum value of the increase rate $\alpha$ of the engine speed in a non-slip state of the drive wheel is $\Delta$NE. Alternatively, the first threshold T1 may not necessarily have the hysteresis, assuming that the value at which integration of the values of the increase rates $\alpha$ of the engine speed starts is equal to the value at which integration of the values of the increase rates $\alpha$ of the engine speed terminates.

Furthermore, the slip determiner 19 is configured to determine that the clutch is in an off-state and the drive wheel is in the non-slip state when the data from the comparator 18 indicates that the vehicle speed value detected by the vehicle speed sensor 6 is at least the predetermined allowable error from the vehicle speed value stored in the gear ratio memory 17. Thus, the crank angle sensor 5, the vehicle speed sensor 6, the gear position sensor 7, the engine speed detector 13, the engine speed increase rate detector 14, the vehicle speed detector 15, the gear position detector 16, the gear ratio memory 17, the comparator 18, and the slip determiner 19 may form a slip detection system 30, which may be incorporated into the ECU 9.

The traction controller 20 may be configured to send a command to the ignition controller 11 to reduce the driving power of the engine 2 to a value smaller than that just before the determination when the slip determiner 19 determines that the drive wheel is in the slip state. In response to the command, the ignition controller 11 may execute an ignition retard control for causing the ignition device 4 to retard an ignition timing for the engine 2.

Figure 3:
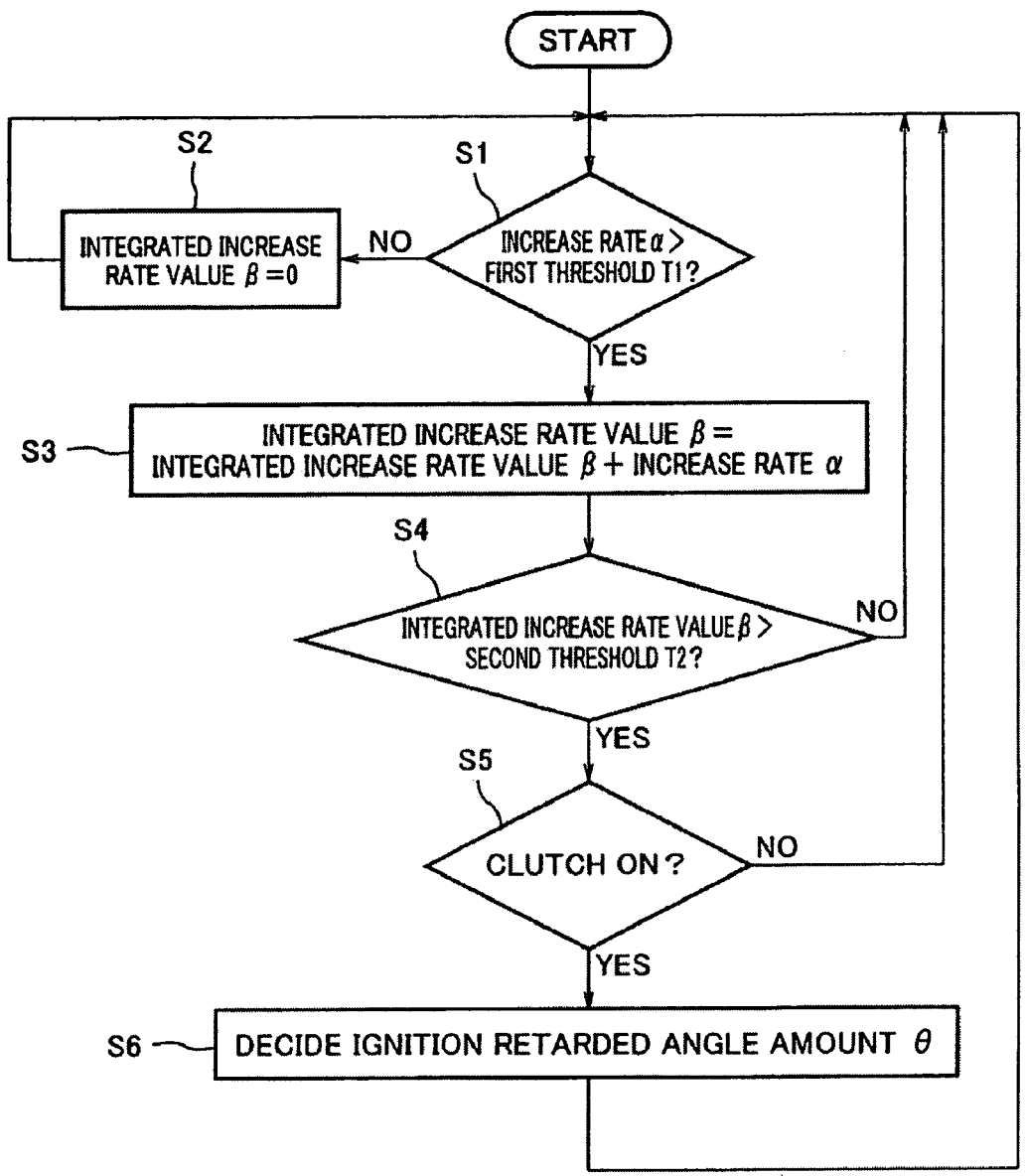
FIG. 3 is a control flowchart of the traction control system of FIG. 1.
Figure 4A:
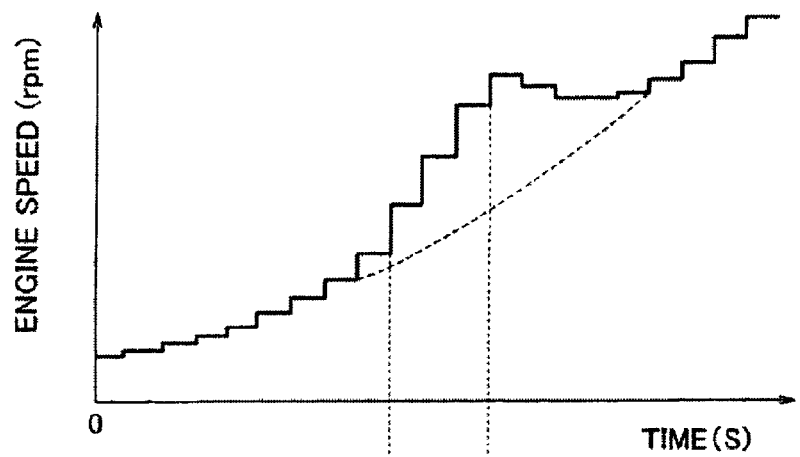
FIGS. 4A to 4D are timing charts showing features associated with the traction control system of FIG. 1.
Figure 4B:
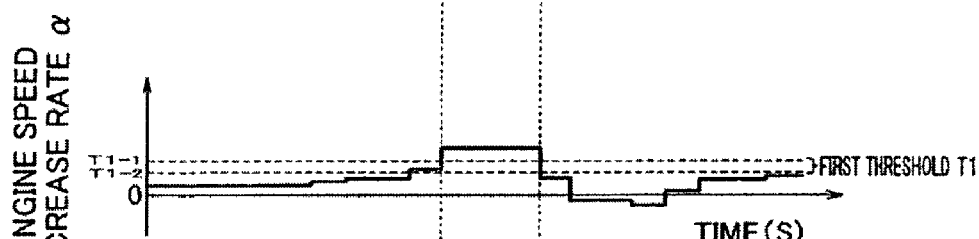

FIG. 3 is a control flowchart of the traction control system 1 of FIG. 1. FIGS. 4A to 4D are timing charts showing features associated with control executed by the traction control system 1 of FIG. 1. FIG. 4A shows engine speed increasing partially irregularly due to wheel slip, with time on the horizontal axis and an engine speed on the vertical axis. FIG. 4B corresponds to FIG. 4A, with time on the horizontal axis and the increase rate $\alpha$ of the engine speed on the vertical axis. As shown in FIG. 3 and FIG. 4B, the slip determiner 19 (FIG. 2) determines whether or not the increase rate $\alpha$ of the engine speed is larger than the first threshold T1 (step S1). To be specific, the first threshold T1 may have a hysteresis in which a predetermined allowable range is set and the value (T1-2) at which integration of the values of the increase rates $\alpha$ of the engine speed terminates is slightly smaller than the value (T1-1) at which integration of the values of the increase rates $\alpha$ of the engine speed starts.

Figure 4C:
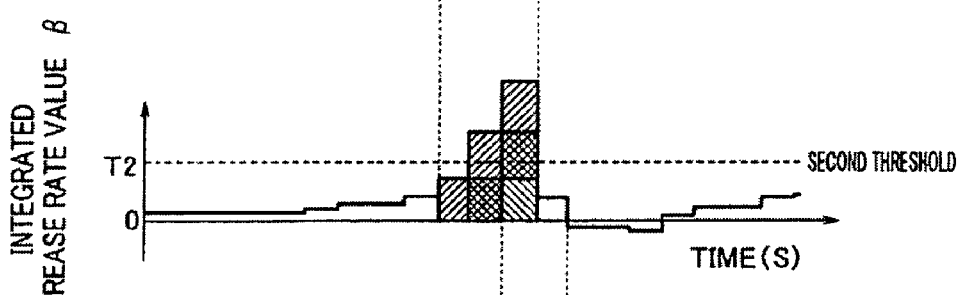

FIG. 4C corresponds to FIG. 4B, with the time on the horizontal axis and the integrated increase rate value $\beta$ on the vertical axis. In step S1, if it is determined that the increase rate a of the engine speed is not larger than the threshold (T1-1), the integrated increase rate value $\beta$ is reset to zero which is an initial value before next sampling starts (step S2). On the other hand, if it is determined that the increase rate α of the engine speed is larger than the threshold (T1-1), the increase rate α of the engine speed is integrated with the integrated increase rate value β (step S3), as shown in FIG. 3 and FIG. 4C. Then, if it is determined that the integrated increase rate value β is not larger than the second threshold T2, the process returns to step S1 and repeats the subsequent steps (step S4). The second threshold T2 is larger than a numeric value corresponding to the first threshold T1 (T1-1, T1-2). To be specific, when the numeric value corresponding to the threshold (T1-1), that is, the numeric value which is obtained by expressing the threshold (T1-1) in dimensionless form is A, the second threshold T2 is set within the range of [3.0×A, 10.0×A].

The reason why the second threshold T2 is set to be no smaller than (3.0×A) is that if the second threshold T2 is smaller than (3.0×A), the integrated increase rate value β becomes larger than the second threshold T2 even though the number of times of integration of the values is still less, and it is detected by mistake that a discontinuous increase in the increase rate α of the engine speed due to the engine noise is a slip occurrence. In addition, the reason why the second threshold T2 is set to be no larger than (10.0×A) is that if the second threshold T2 is larger than (10.0×A), the integrated increase rate value β does not become larger than the second threshold T2 unless the number of times of integration of the integrated value is relatively large, lowering responsiveness in slip detection.

As shown in FIG. 3 and in FIG. 4C, if it is determined that the integrated increase rate value β becomes larger than the second threshold T2 in step S4, it is determined whether the clutch is in the on-state or in the off-state (step S5). To be more specific, as shown in FIGS. 2 and 3, the slip determiner 19 determines that the clutch is in the on-state if the comparator 18 sends to the slip determiner 19 a signal indicating that the vehicle speed value detected by the vehicle speed sensor 6 is within the predetermined allowable error range with respect to the vehicle speed value stored in the gear ratio memory 17. Otherwise, the slip determiner 19 determines that the clutch is in the off-state, and the drive wheel is in the non-slip state (step S5).

This is represented by the following formulae. To be specific, when a ratio between the engine speed and the vehicle speed corresponding to each gear position n is R(n) as indicated by formula (1), it is determined that the clutch is in the on-state when R(n) satisfies formula (2), whereas it is determined that the clutch is in the off-state when R(n) does not satisfy the formula (2).

$$R(n)\text{=engine speed/vehicle speed} \quad (1),$$

and a formula (2) represented by:

$$\{R(n)+R(n+1)\}/2 < R(n) < \{R(n)+R(n-1)\}/2 \quad (2),$$

where n is an integer from 1 to 6, and 1.1×R(1)<R(0)<2.0×R(1), and R(7)=-R(6).

If it is determined that the clutch is in the off-state, the slip determiner 19 determines that the drive wheel is in the non-slip state, and repeats the step S1 and the following steps (step S5). On the other hand, if it is determined that the clutch is in the on-state, the traction controller 20 decides an ignition retard angle amount θ, and executes the ignition retard control for retarding the ignition timing for the engine 2 to thereby reduce the driving power of the engine 2 (step S6).

Figure 4D:
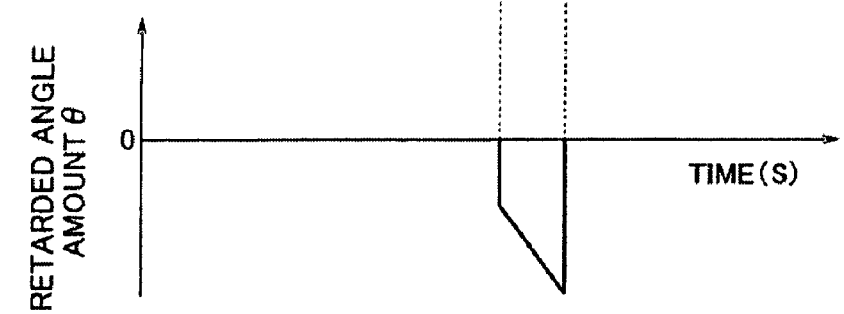

FIG. 4D corresponds to FIG. 4C, with time on a horizontal axis and the ignition retard angle amount θ on a vertical axis.

Figure 6:
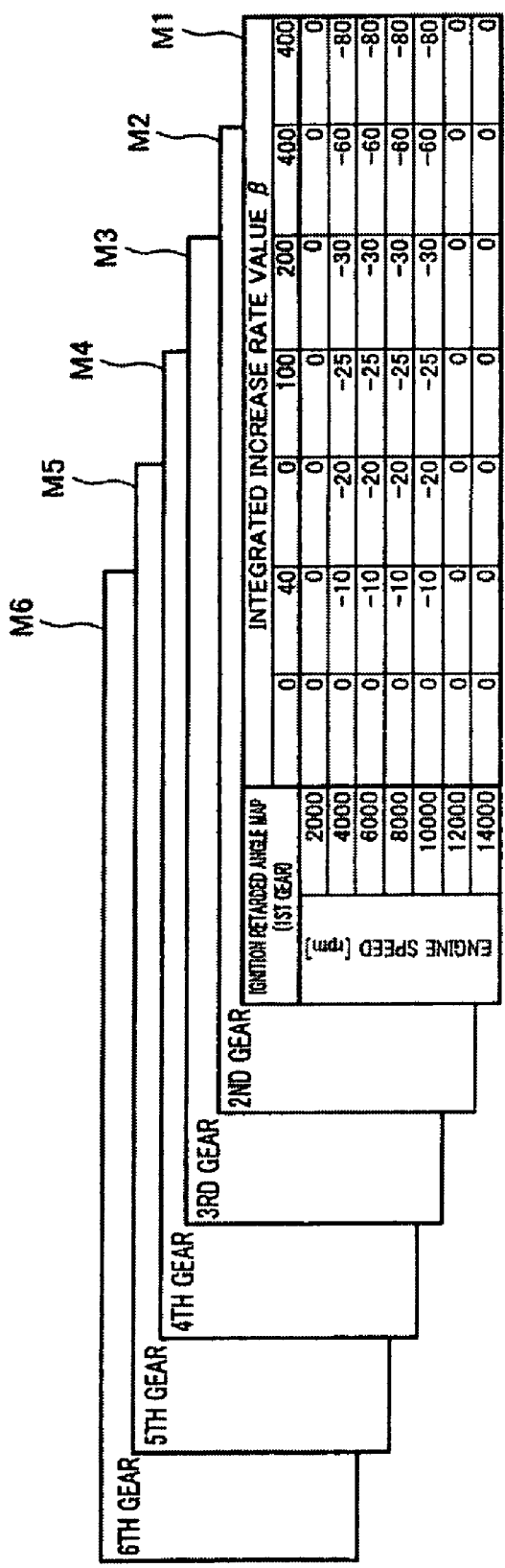
FIG. 6 is a view showing an ignition retard angle map for each gear position.

As shown in FIG. 4D, the ignition retard angle amount θ increases as the integrated increase rate value β increases. To be specific, as shown in FIG. 6, the traction controller 20 has ignition retard angle maps M1 to M6 which are driving power reduction amount maps for respective gear positions. The traction controller 20 may be configured to set a retard angle amount corresponding to a current integrated increase rate value β and a current engine speed, with reference to the associated ignition retard angle map.

For example, according to the ignition retard angle map M1 of FIG. 6, the retard angle amount θ is set to increase in a range of −10 degrees to −80 degrees as the integrated increase rate value β increases when the engine speed is in a range of 4000 to 10000 rpm. As shown in FIG. 4D, subsequent sampling timing is subjected to ignition retard control with the retard angle amount θ corresponding to the integrated increase rate value β.

With the above described configuration, it is determined that the drive wheel is in a substantially non-slip state in cases where the increase rate α of the engine speed becomes larger than the first threshold T1 for a moment, due, for example, to the engine noise, whereas it is determined that the drive wheel is in the on-state only when the integrated increase rate value β obtained by integrating the values of the increase rates α of engine speed has become larger than the second threshold T2 because the value of the increase rate α of the engine speed has continuously become larger than the first threshold T1. The first threshold T1 is set lower to accurately detect a slip when the increase rate α of the engine speed is small. But, the integrated increase rate value β does not become larger than the second threshold T2 unless the value of the increase rate α of the engine speed continuously becomes larger than the first threshold T1. This makes it possible to reduce the chances of a mistaken detection that the drive wheel is in the slip state when the value of the increase rate α of the engine speed discontinuously becomes larger than the first threshold T1 due to the engine noise, etc. As a result, it becomes possible to detect with higher precision whether or not a drive wheel is in a slip state with respect to a road surface. When it is determined that a drive wheel is in a slip state, the traction controller 20 (see FIG. 2) may reduce the driving power of the engine 2 to a value smaller than that just before the determination, thereby automatically restoring drive wheel traction on the road surface.

As described above, the first threshold T1 has the hysteresis in which the value (T1-2) at which the integration of the values of the increase rates α of the engine speed terminates is slightly smaller than the value (T1-1) at which the integration of the values of the increase rates α of the engine speed starts. For this reason, the increase rate α of the engine speed is less likely to become smaller than the first threshold (T1-2) at which the integration of the values of the increase rates α terminates even though the increase rate α of the engine speed decreases due to the engine noise, etc, after the value of increase rate α of the engine speed has become larger than the first threshold (T1-1) at which the integration of the values of the increase rates α starts. This makes it possible to reduce the chances that the integration terminates by mistake even through the increase rate α of the engine speed fluctuates because of some detection error. Thus, it becomes possible to correctly start and terminate the integration of the values of the increase rates α of the engine speed using the first threshold T1 as a reference.

Furthermore, if the vehicle speed value detected by the vehicle speed sensor 6 is the predetermined allowable error or larger different from the vehicle speed value which is data associated with the on-state of the clutch and is pre-stored in the gear ratio memory 17 (FIG. 2), the slip determiner 19 (FIG. 2) determines that the engine speed has rapidly increased because of the off-operation of the clutch rather than occurrence of the slip. Thus, false detection of occurrence of the slip can be reduced even though the increase rate α of the engine speed increases because of the off-operation of the clutch. Moreover, since the traction controller 20 increases the retard angle amount θ as the integrated increase rate value β rises and the slip increases in amount, thereby reducing the driving power of the engine 2, the drive wheel traction can be restored without making a driver feel discomfort in driving the vehicle.

Embodiment 2

Figure 7:
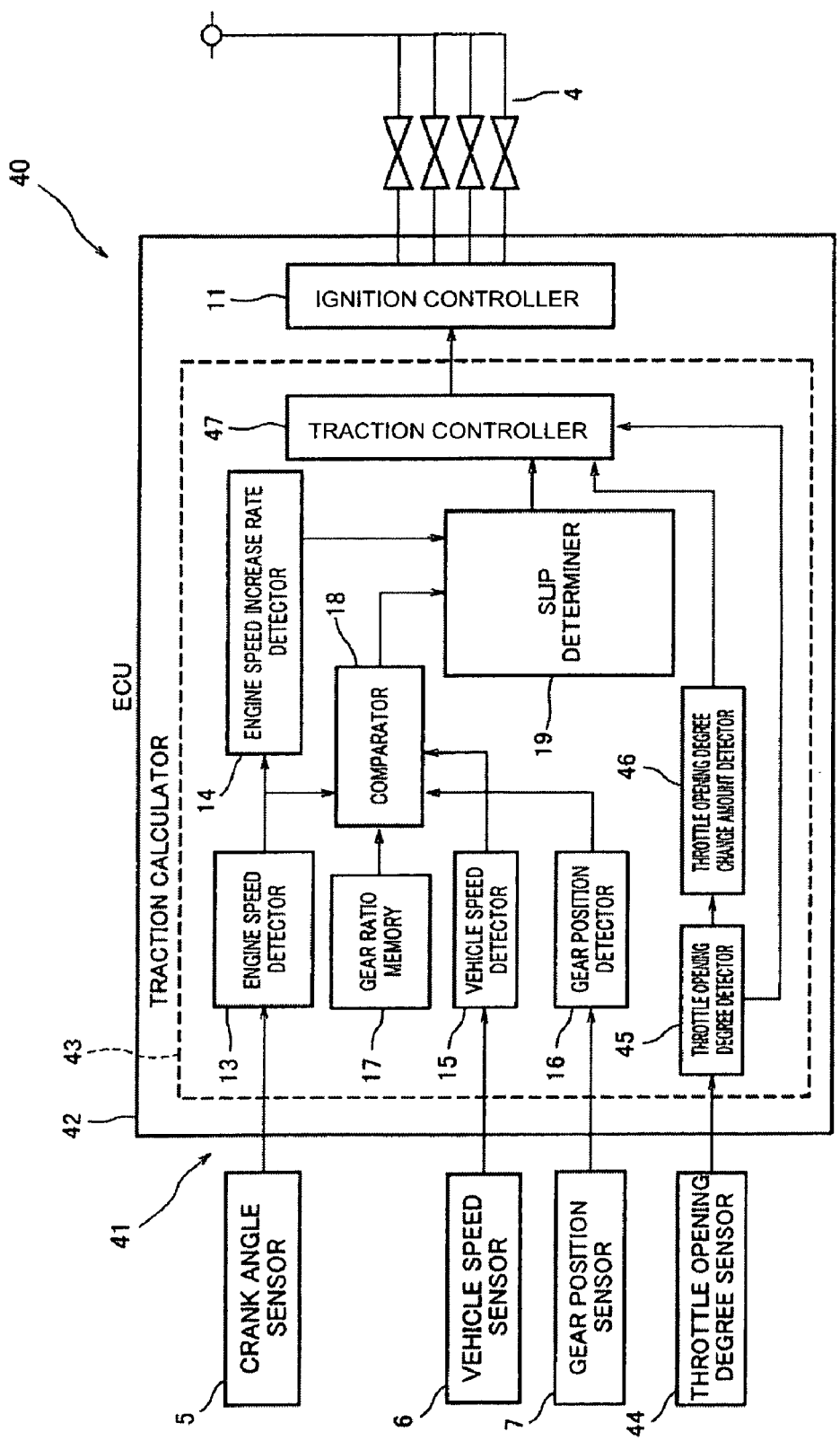
FIG. 7 is a block diagram showing an ECU of a traction control system according to a second embodiment.

FIG. 7 is a block diagram showing an ECU 42 of a traction control system 40 according to a second embodiment. In FIG. 7, the same reference numerals as those in the first embodiment denote the same or corresponding components, which will not be further described in the second embodiment. As shown in FIG. 7, the ECU 42 includes a traction calculator 43 and the ignition controller 11. The traction calculator 43 includes an engine speed detector 13, an engine speed increase rate detector 14, a vehicle speed detector 15, a gear position detector 16, a gear ratio memory 17, a comparator 18, a slip determiner 19, a throttle opening degree detector 45, a throttle opening degree change amount detector 46, and a traction controller 47. In addition, a throttle opening degree sensor 44 is attached on a known throttle device (not shown) for controlling an amount of air taken in from outside and supplied to the engine 2, and may be configured to detect an opening degree of a throttle valve.

The throttle opening degree detector 45 is configured to detect an opening degree amount of a throttle valve based on a signal from the throttle opening degree sensor 44. The throttle opening degree change amount detector 46 is configured to detect a change amount (change rate) of the opening degree of the throttle valve in a predetermined time based on a signal from the throttle opening degree detector 45. The traction controller 47 is configured to execute an ignition retard control for the ignition timing of the engine 2 while compensating a retard angle amount according to the opening degree and the associated change amount of the throttle valve, when the slip determiner 19 determines that the drive wheel is in a slip state.

FIG. 8 illustrates a compensation map for compensating a retard angle amount based on the opening degree and the opening degree change amount of the throttle valve. More specifically, as shown in FIG. 8, traction controller 47 (FIG. 7) has a compensation map in which a compensation amount of the retard angle amount is set to correspond to the opening degree and the opening degree change amount of the throttle valve. The traction controller 47 (FIG. 7) is configured to set, as the retard angle amount, a value obtained by multiplying a value obtained from the ignition retard angle map of FIG. 6 by a value obtained from the compensation map of FIG. 8.

With the above described configuration, it becomes possible to identify a situation where the driver has intentionally quickly opened the throttle valve to cause the drive wheel to slip on the road surface, and to compensate the retard angle amount accordingly. For example, in the case of a vehicle intended for racing, when the throttle valve is quickly opened by the driver, a retard angle amount may be compensated to be reduced to meet the driver's demand.

Embodiment 3

Figure 9:
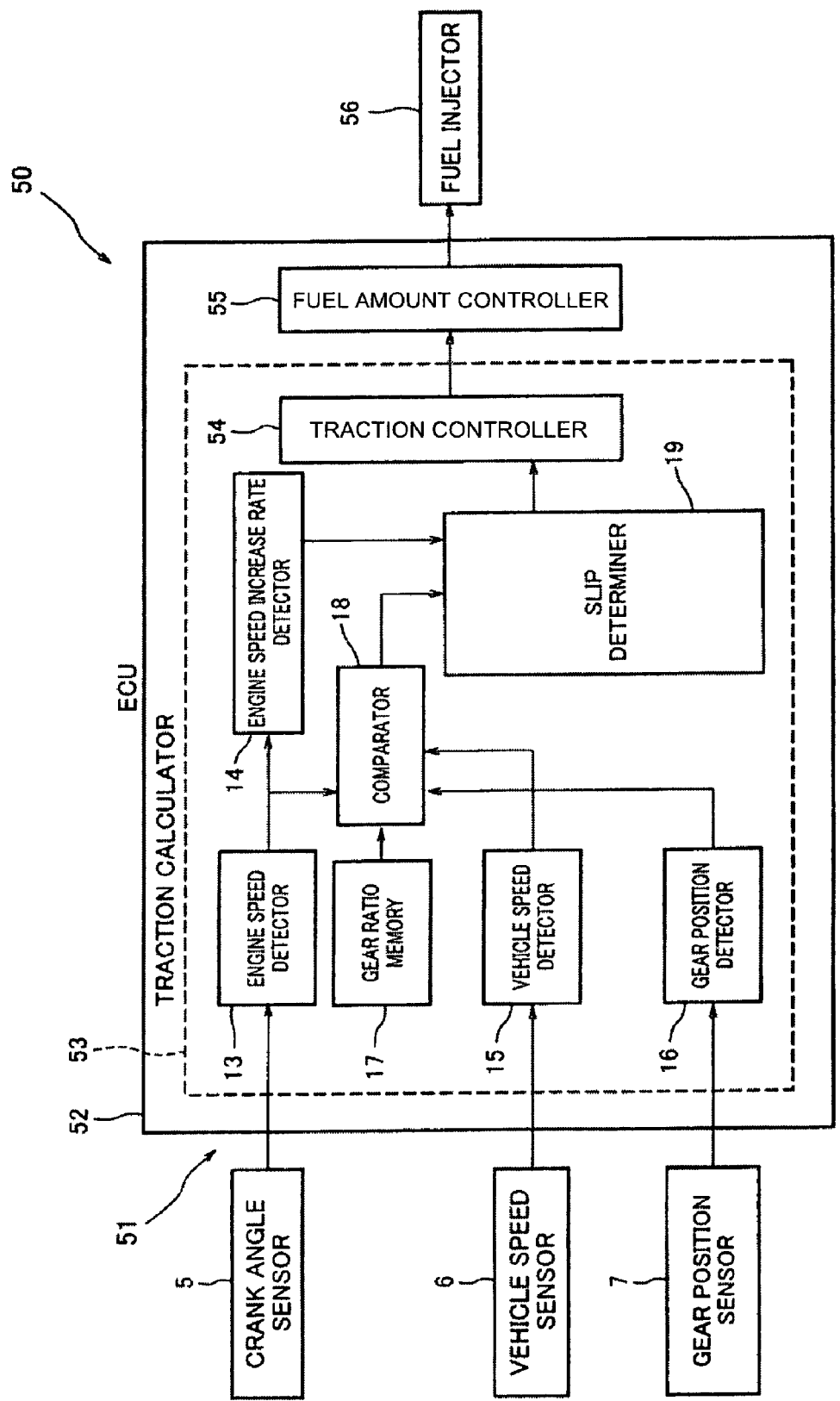
FIG. 9 is a block diagram showing an ECU of a traction control system according to a third embodiment.

FIG. 9 is a block diagram showing an ECU 52 of a traction control system 50 according to a third embodiment. In the third embodiment, instead of the ignition retard control of the first embodiment, a fuel feed amount cut control is used to reduce an amount of fuel to be fed to the engine 2 so that the driving power of the engine 2 is reduced. In FIG. 9, the same reference numerals as those in the first embodiment denote the same or corresponding components, which will not be further described in the third embodiment. As shown in FIG. 9, the ECU 52 includes a traction calculator 53 and a fuel amount controller 55. The traction calculator 53 includes an engine speed detector 13, an engine speed increase rate detector 14, a vehicle speed detector 15, a gear position detector 16, a gear ratio memory 17, a comparator 18, a slip determiner 19, and a traction controller 54. A fuel injector 56 is communicatively coupled to the ECU 52 and is configured to inject fuel inside an air-intake pipe (not shown) connected to a cylinder of the engine 2.

The traction controller 54 sends a command to the fuel amount controller 55 to reduce the driving power of the engine 2 to a value smaller than that just before the determination, when the slip determiner 19 determines that the drive wheel is in the slip state. In response to the command, the fuel amount controller 55 executes the fuel feed amount cut control to cause the fuel injector 56 to reduce the amount of the fuel to be injected to the air-intake pipe connected to the cylinder of the engine 2. In this case, the amount of the fuel fed to the air-intake pipe may be reduced, or some fuel feedings may be skipped to reduce the number of times fuel is fed to each cylinder. In the case of a multi-cylinder engine, fuel feedings to a subset of multiple cylinders may be stopped. The traction controller 54 has a fuel feed amount cut map (not shown) which is similar to the driving power reduction amount map for each gear position shown in FIG. 6. The traction controller 54 is configured to set a fuel feed amount corresponding to a current integrated increase rate value β and a current engine speed, with reference to the fuel feed amount cut map.

As in the second embodiment, the traction controller 54 may be configured to execute the fuel feed amount cut control while compensating the fuel feed amount according to the opening degree and the associated change amount of the throttle valve, when the slip determiner 19 determines that the drive wheel is in the slip state. In that case, the traction controller 54 may set as a value of the fuel feed amount a value obtained by multiplying the value obtained from the fuel feed amount cut map by the value obtained from the compensation map of FIG. 8. The other configuration is identical to that of the first embodiment, and will not be further described herein.

Embodiment 4

Figure 10:
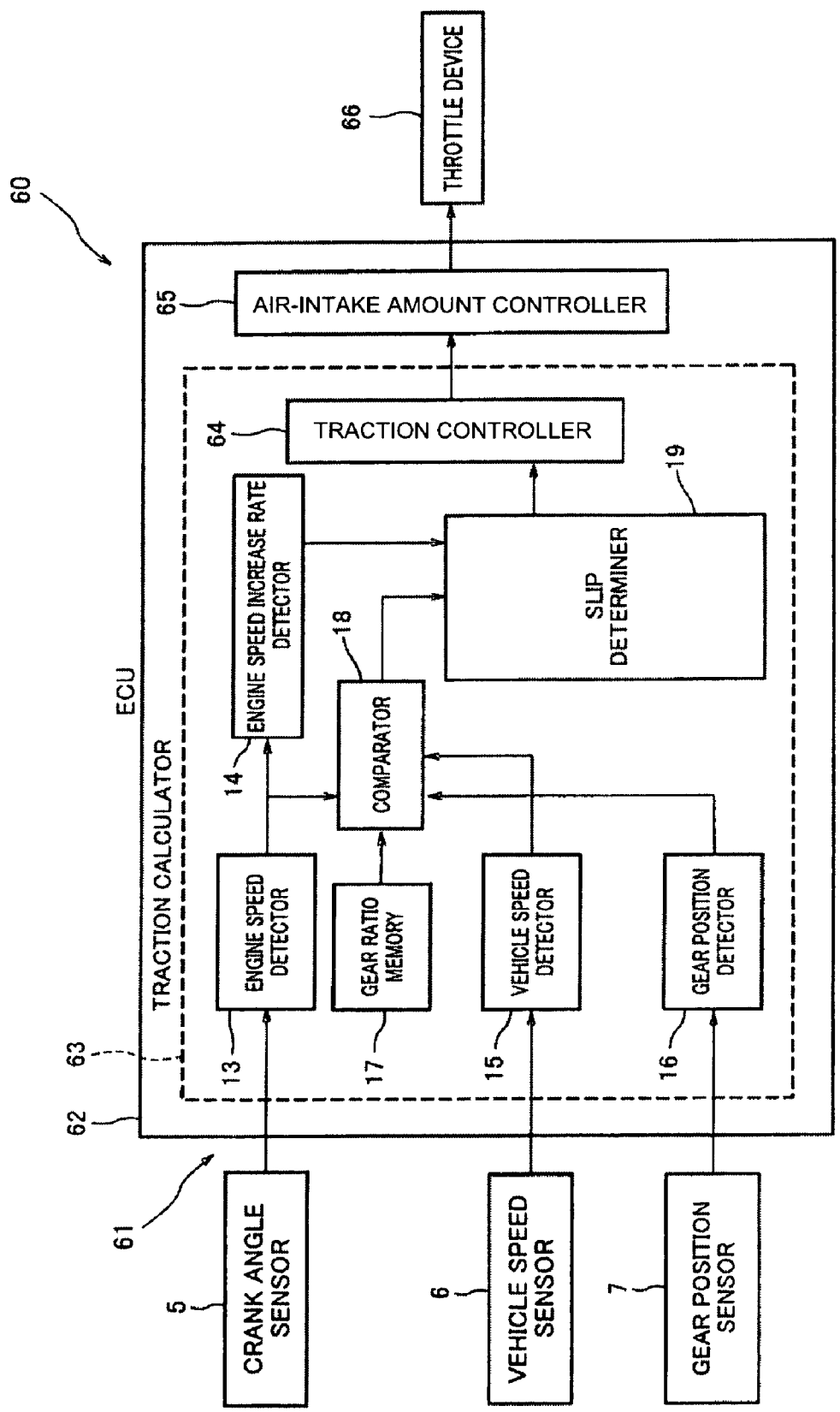
FIG. 10 is a block diagram showing an ECU of a traction control system according to a fourth embodiment.

FIG. 10 is a block diagram showing an ECU 62 of a traction control system 60 according to a fourth embodiment. In the fourth embodiment, instead of the ignition retard control of the first embodiment, an air-intake amount cut control for controlling an air-intake amount is used to reduce the driving power of the engine 2. In FIG. 10, the same reference numerals as those in the first embodiment denote the same or corresponding components, which will not be further described in the fourth embodiment. As shown in FIG. 10, the ECU 62 includes a traction calculator 63 and an air-intake amount controller 65. The traction calculator 63 includes an engine speed detector 13, an engine speed increase rate detector 14, a vehicle speed detector 15, a gear position detector 16, a gear ratio memory 17, a comparator 18, a slip determiner 19, and a traction controller 64. A throttle device 66 is communicatively coupled to the ECU 62 and is configured to control an amount of air taken in from outside and supplied to the cylinder of the engine 2. Examples of the throttle device 66 are an electronic control throttle device configured to electronically control an opening degree of a throttle valve, a throttle device including a main throttle valve operated directly by the driver via a wire and the like and a sub-throttle valve positioned upstream or downstream of the main throttle valve, whose opening degree is configured to be electronically controlled, etc.

The traction controller 64 sends a command to the air-intake amount controller 65 to reduce the driving power of the engine 2 to a value smaller than that just before the determination when the slip determiner 19 determines that the drive wheel is in the slip state. In response to the command, the air-intake amount controller 65 executes the air-intake amount cut control for causing the throttle device 66 to decrease the opening degree of the throttle valve (not shown), thereby reducing the amount of air supplied to the engine 2. The traction controller 64 has an air-intake amount cut map (not shown) which is similar to the driving power reduction amount map for each gear position shown in FIG. 6. The traction controller 64 is configured to set an air-intake amount corresponding to a current integrated increase rate value β and a current engine speed, with reference to the air-intake amount cut map.

As in the second embodiment, the traction controller 64 may be configured to execute the air-intake amount cut control while compensating the air-intake amount according to the opening degree and the associated change amount of the throttle valve, when the slip determiner 19 determines that the drive wheel is in the slip state. In that case, the traction controller 64 may set as a value of the air-intake amount, a value obtained by multiplying the value obtained from the air-intake amount cut map by the value obtained from the compensation map of FIG. 8. The other configuration is identical to that of the first embodiment, and will not be further described herein.

Embodiment 5

A traction control system 20 of a fifth embodiment includes, instead of the ignition retard control of the first embodiment, an ignition cut control configured sometimes skip ignitions for the engine 2 to reduce the number of times of ignition for the vehicle 2, thereby reducing the driving power of the engine 2. The configuration of the traction control system 20 is substantially similar to that of the first embodiment, and will be described with reference to FIG. 2. The traction control system 20 sends a command to the ignition controller 11 to reduce the driving power of the engine 2 to a value smaller than that just before the determination when the slip determiner 19 determines that the drive wheel is in the slip state. In response to the command, the ignition controller 11 is configured to execute the ignition cut control to reduce the number of times of ignition for the engine 2.

The ignition cut control may be used in such a manner that the number of times of ignition performed for each cylinder may be reduced in time series, or otherwise ignition for a subset of multiple cylinders may be stopped in the case of the multiple-cylinder engine. The traction controller 20 has an ignition cut map (not shown) which is similar to the driving power reduction amount map for each gear position shown in FIG. 6. The traction controller 20 is configured to set an ignition cut amount corresponding to a current integrated increase rate value β and a current engine speed, with reference to the ignition cut map. As in the second embodiment, the traction controller 20 may be configured to execute the ignition cut control while compensating the ignition cut amount according to the opening degree and the associated change amount of the throttle valve, when the slip determiner 19 determines that the drive wheel is in the slip state.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A slip detection system for a vehicle, comprising:
   an engine speed detector configured to detect an engine speed of an engine mounted in the vehicle;
   an engine speed increase rate detector configured to detect an increase rate of the engine speed detected by the engine speed detector over a predetermined time; and
   a slip determiner configured to integrate increase rates over respective predetermined times, from when the increase rate detected by the engine speed increase rate detector becomes larger than a first threshold until the increase rate becomes smaller than the first threshold, and to determine that a drive wheel of the vehicle is in a slip-state when an integrated value resulting from integration of values of the increase rates becomes larger than a second threshold.

2. The slip detection system for a vehicle according to claim 1, wherein the first threshold has a hysteresis in which a value at which integration of the values of the increase rates terminates is smaller than a value at which integration of the values of the increase rates starts.

3. The slip detection system for a vehicle according to claim 1, wherein the first threshold has a start threshold at which integration of the values of the increase rates starts and a termination threshold at which integration of the values of the increase rates terminates; and wherein the termination threshold is smaller than the start threshold.

4. The slip detection system for a vehicle according to claim 3, wherein the second threshold is set to a value which is not smaller than three times as large as a numeric value corresponding to the start threshold and is not larger than ten times as large as the numeric value corresponding to the start threshold.

5. The slip detection system for a vehicle according to claim 1, further comprising:
   a vehicle speed sensor configured to detect a vehicle speed value of the vehicle;
   a gear position sensor configured to detect a gear position of a transmission equipped in the vehicle; and
   a gear ratio memory configured to pre-store data indicating a relationship between an engine speed and a vehicle speed for each gear position in a state where a clutch of the vehicle is in an on-state; wherein the slip determiner determines that a drive wheel is in a non-slip state, when the vehicle speed value detected by the vehicle speed sensor is at least a predetermined allowable error from a vehicle speed value which is stored in the gear ratio memory and corresponds to the gear position detected by the gear position sensor and the engine speed detected by the engine speed detector.

6. The slip detection system for a vehicle according to claim 5, wherein the vehicle speed sensor is configured to detect the vehicle speed of the vehicle based on a number of rotations of an output shaft of the transmission.

7. The slip detection system for a vehicle according to claim 5, wherein the slip determiner determines that the vehicle speed value is within a range of predetermined allowable error, when a ratio R(n) of the engine speed to the vehicle speed as a function of gear position n, specifically $R(n)$=engine speed/vehicle speed satisfies $\{R(n)+R(n+1)\}/2 < R(n) < \{R(n)+R(n-1)\}/2$ where n is a positive integer, and wherein n is a positive integer, and for the purposes of the relationship above, R(0) is defined such that:

$1.1 \times R(1) < R(0) < 2.0 \times R(1).$

8. A traction control system for a vehicle, which is configured to inhibit occurrence of a slip in a drive wheel of the vehicle, using a slip detection system for the vehicle including:
   an engine speed detector configured to detect an engine speed of an engine mounted in the vehicle;
   an engine speed increase rate detector configured to detect an increase rate in a predetermined time of the engine speed detected by the engine speed detector; and
   a slip determiner configured to integrate values of increase rates in respective predetermined times, from when the increase rate detected by the engine speed increase rate detector becomes larger than a first threshold until the increase rate becomes smaller than the first threshold, and to determine that a drive wheel of the vehicle is in a slip-state when an integrated value resulting from integration of the values of the increase rates becomes larger than a second threshold, the traction control system comprising:
   a traction controller configured to reduce a driving power of the engine when the slip detection system determines that the drive wheel is in the slip state.

9. The traction control system for a vehicle according to claim 8, wherein the traction controller is configured to execute an ignition retard control to retard an ignition timing for the engine, thereby reducing the driving power of the engine, when the slip determiner determines that the drive wheel is in the slip state.

10. The traction control system for a vehicle according to claim 9, wherein the traction controller is configured to execute the ignition retard control so as to increase an ignition retard angle amount as the integrated value increases.

11. The traction control system for a vehicle according to claim 8, wherein the traction controller is configured to execute fuel feed amount cut control to reduce an amount of a fuel to be fed to the engine, thereby reducing the driving power of the engine, when the slip determiner determines that the drive wheel is in the slip state.

12. The traction control system for a vehicle according to claim 8, wherein the traction controller is configured to execute air-intake amount cut control to reduce an amount of air supplied to the engine, thereby reducing the driving power of the engine, when the slip determiner determines that the drive wheel is in the slip state.

13. The traction control system for a vehicle according to claim 8, wherein the traction controller is configured to execute ignition cut control to reduce a number of times of ignition for the engine, thereby reducing the driving power of the engine, when the slip determiner determines that the drive wheel is in the slip state.

14. The traction control system for a vehicle according to claim 8, further comprising:
   a throttle opening degree sensor configured to detect an opening degree of a throttle valve; wherein the traction controller is configured to decide a reduction amount of the driving power of the engine according to a change rate of the opening degree of the throttle valve which is detected by the throttle opening degree sensor.

15. The traction control system for a vehicle according to claim 14, wherein the reduction amount of the driving power of the engine is an ignition retard angle amount, a fuel cut amount, an air-intake cut amount, and/or an ignition cut amount.

16. The traction control system for a vehicle according to claim 14, wherein the traction controller has a driving power reduction amount map in which a reduction amount of the driving power of the engine is set to correspond to the integrated value and the engine speed for each gear position, and a compensation map in which a compensation amount is set to correspond to the opening degree of the throttle valve and an opening degree change amount of the throttle valve;
   and wherein the traction controller is configured to execute compensation such that a value obtained from the driving power reduction amount map is compensated by the compensation amount obtained from the compensation map.

17. A method of detecting a slip for a vehicle, comprising:
   detecting an engine speed of an engine mounted in the vehicle;
   detecting an increase rate in a predetermined time of the engine speed;
   integrating values of increase rates of the engine speed over respective predetermined times from when the increase rate becomes larger a first threshold until the increase rate becomes smaller than the first threshold; and
   determining that a drive wheel of the vehicle is in a slip state when an integrated value resulting from integration of the values of the increase rates becomes larger than a second threshold.

18. The method according to claim 17, wherein it is determined that the drive wheel is in a non-slip state when an actual vehicle speed value corresponding to an actual gear position and an actual engine speed is at least a predetermined allowable value from data indicating a relationship among an engine speed, a vehicle speed, and a gear position in a state where a clutch of the vehicle is in an on-state.

* * * * *